March 3, 1959 B. G. BJORNSON ET AL 2,876,285

TRANSISTOR SWITCHING NETWORK FOR COMMUNICATION SYSTEM

Filed Feb. 2, 1953 4 Sheets-Sheet 1

INVENTORS B. G. BJORNSON
E. BRUCE
BY J. W. Schmied
ATTORNEY

March 3, 1959 B. G. BJORNSON ET AL 2,876,285
TRANSISTOR SWITCHING NETWORK FOR COMMUNICATION SYSTEM
Filed Feb. 2, 1953 4 Sheets-Sheet 2

INVENTORS B. G. BJORNSON
E. BRUCE
BY J. W. Schmied
ATTORNEY

INVENTORS B.G. BJORNSON
E. BRUCE
BY J. W. Schmied
ATTORNEY

March 3, 1959 B. G. BJORNSON ET AL 2,876,285

TRANSISTOR SWITCHING NETWORK FOR COMMUNICATION SYSTEM

Filed Feb. 2, 1953 4 Sheets-Sheet 4

INVENTORS B. G. BJORNSON
E. BRUCE
BY J. W. Schmied
ATTORNEY

United States Patent Office 2,876,285

Patented Mar. 3, 1959

2,876,285

TRANSISTOR SWITCHING NETWORK FOR COMMUNICATION SYSTEM

Bjorn G. Bjornson, New York, N. Y., and Edmond Bruce, Fairhaven, N. J., assignors to Bell Telephone Laboratories, Incorporated, New York, N. Y., a corporation of New York Application February 2, 1953, Serial No. 334,552

19 Claims. (Cl. 179—18)

This invention relates to a selective switching network for telephone switching systems and more particularly to a switching network employing a plurality of transistors therein.

Heretofore in the prior art switching networks have been utilized that comprises a plurality of cross-points defining the possible paths that occur between input and output leads. In a rectangular switch having a number of input and output leads the device which connects a particular input lead with a particular output lead is commonly referred to as a cross-point. Cross-points, in general, refer to possible paths and any number of cross-points may determine the complete path between a particular input and output lead. The selective path, for example, may pass through four cross-points between an input and an output lead with each cross-point determining a unique route or path. In telephone switching it is desirable to have cross-points which incorporate several special characteristics as follows:

(1) The cross-point should have a large impedance ratio between the transmission and the non-transmission states.

(2) The cross-point should cause little distortion noise or loss during transmission.

(3) The cross-point should make a connection only when both the inlet and outlet thereto are marked by voltages.

(4) The cross-point should be self-locking after a connection is effected so as not to require expensive controls.

(5) Other cross-points having access to an inlet or outlet of an employed cross-point should be disabled to insure privacy.

(6) The cross-point requirement with regards to power for connecting and holding should be low.

(7) The cross-point should be reliable, uniform, rugged, small and inexpensive.

The switches having cross-points that were utilized in the prior art, in general, comprised cross bar equipment, reed diode equipment and gas diode equipment. These switch types require comparatively high operating voltages, high cost per cross-point, high holding power per utilization or conversation, high connecting power per new request or desired connection and the cross bar and reed diode switches, in addition, require extra control leads at their cross-points.

It is then an object of the present invention to provide a selective switching network in accordance with the desirable characteristics tabulated above.

Another object of the present invention is to provide improved methods, circuits and apparatus for establishing connections through switching networks in which transistors employed for selecting a path through the network are also employed to convey the intelligence or telephone voice currents through the network.

Still another object of the present invention is the provision of novel apparatus for disconnecting or interrupting an established path through the system which comprises applying a predetermined voltage condition to one end of an established path through the switching network.

Still another object of the present invention is the provision of novel circuits for suppressing surges of currents occurring on the subscribers' lines and also those generated within the switching network so that these surges or extraneous currents do not materially interfere with the selection or establishment of a path or with the conveyance of telephone currents over the established path or with the disconnection or interruption of an established path through the switching network.

Still another object of the present invention is the provision of a transistor cross-point in a switching network which has an effective collector-to-emitter current ratio greater than unity, high back impedance, and is in the form of a two-terminal device.

Still another object of the present invention is the provision of novel circuits utilizing semiconductor diodes for marking the inlets and outlets of the switching network.

Briefly, in accordance with this invention an improved telephone switching arrangement is provided which operates semiautomatically for establishing paths between a calling subscriber's station and a called subscriber's station under control of an operator. The operator responds to each call from a subscriber's line, in response to the lighting of a lamp, and connects the operator's telephone set to the calling subscriber's line to determine the called subscriber's number. The operator then examines the calling and busy lamps of the called subscriber's line and if the line is idle sets a plurality of manual switches first in accordance with the number of the called subscriber's station, then in accordance with the number or designation of an idle local transmission circuit. The operator thereafter operates a start or connect key causing the called subscriber's line to be connected to the designated transmission circuit. Thereafter, the operator will operate switches or keys or dials in accordance with the number or designation of the calling subscriber's station and a number designating the same transmission circuit, and again operate the start or connect switches or keys. Thereupon, the called subscriber's line is connected with the calling subscriber's line and the operator may operate a ringing key to ring the called subscriber's bell. At the termination of a call the operator upon observing a disconnect lamp will again operate switches in accordance with one or the other of the subscriber's number and then operate a disconnect key. Thereafter the operator will operate the switches in accordance with the other subscriber's number and again operate the disconnect key, which operations cause the established path between the two subscribers to be interrupted and restored to normal.

Alternatively, the operator may disconnect the subscribers' lines by operating her keys in accordance with the numbers of the transmission circuits and thereafter operate the disconnect key which in turn causes each of the paths through the switching equipment from the transmission circuit to the subscriber's line to be interrupted and the circuits restored to their idle or normal condition.

The switching network utilizes a plurality of transistor triggering units as talking path cross-points. Transistors are well known in the art, as for example, the Patent 2,524,035 which was granted on October 3, 1950, to J. Bardeen and W. H. Brattain. Briefly, a transistor in one of its forms comprises a small block of semiconductor material, such as N-type germanium, with which are associated three electrodes. One of these, known as the base electrode, makes a low resistance contact with one face of the block. The others, known respectively as the emitter and collector, preferably make rectifier contact with the block. If a signal voltage is applied between the emitter and the base, an amplified replica thereof will appear across the load connected in the collector circuit. The transistor circuits or units utilized herein provide a collector-to-emitter current ratio greater than unity, high back impedance and a negative resistance characteristic.

Further objects, features and advantages of this invention will become apparent to those skilled in the art upon considering the following description when read with reference to the attached drawings in which:

Figs. 1, 2, 3 and 4 show in detail a few exemplary circuits embodying the present invention;

Fig. 5 shows the manner in which Figs. 1, 2, 3 and 4 are positioned adjacent each other; and Fig. 6 is a graph illustrating the voltage current relationship of a suitable transistor cross-point which includes positive feedback.

Figure 1:
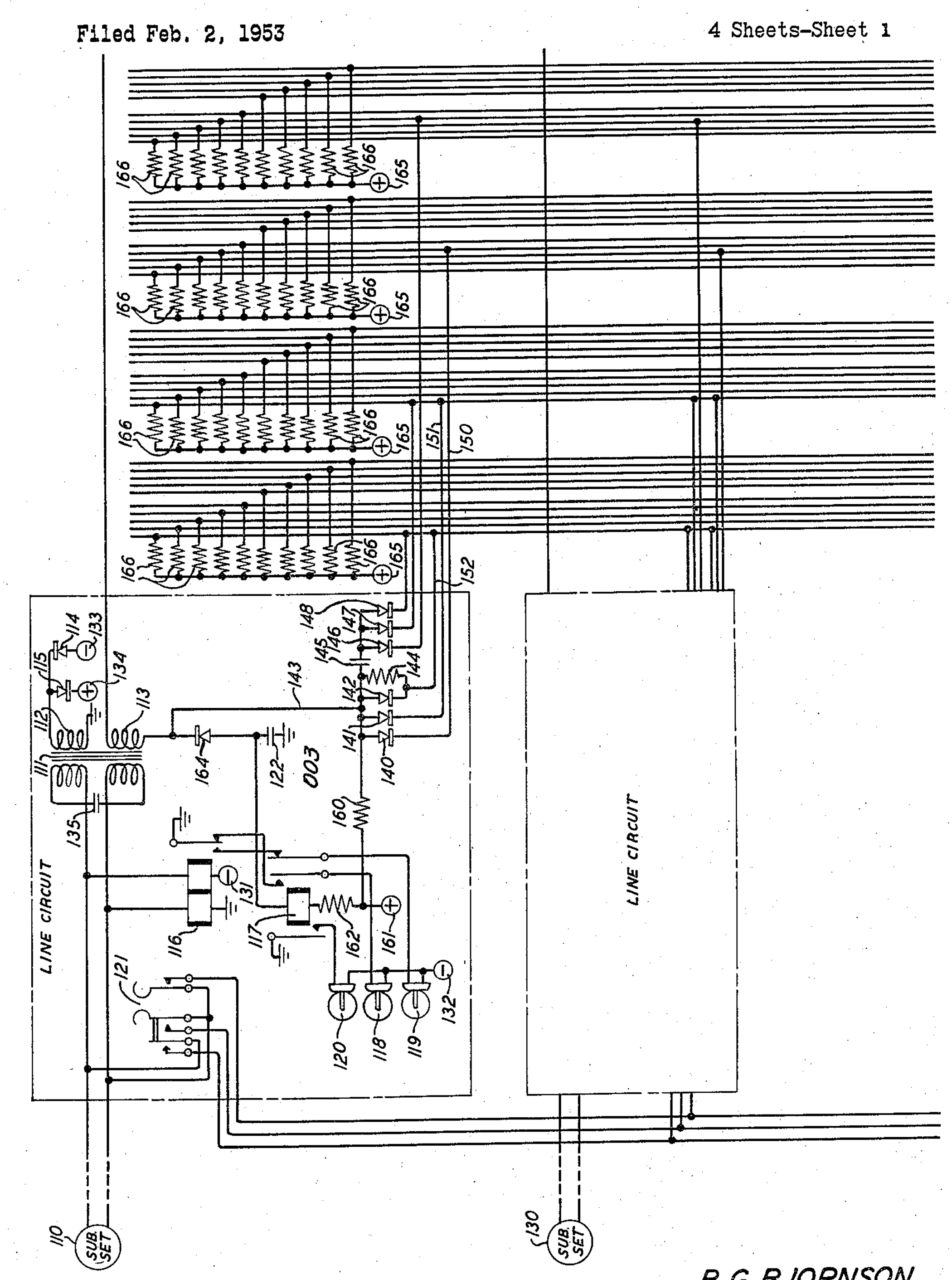
Figure 2:
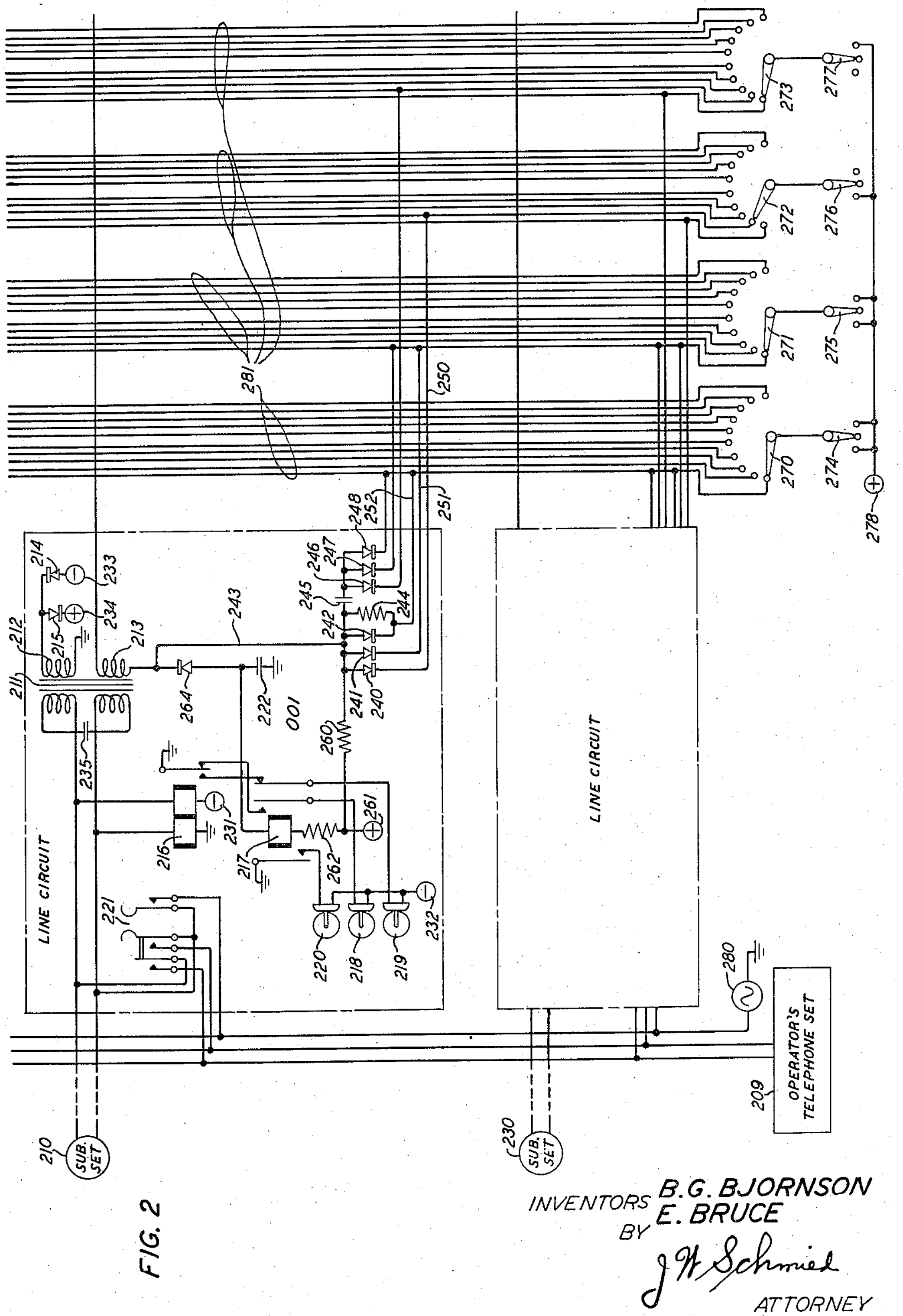
Figure 3:
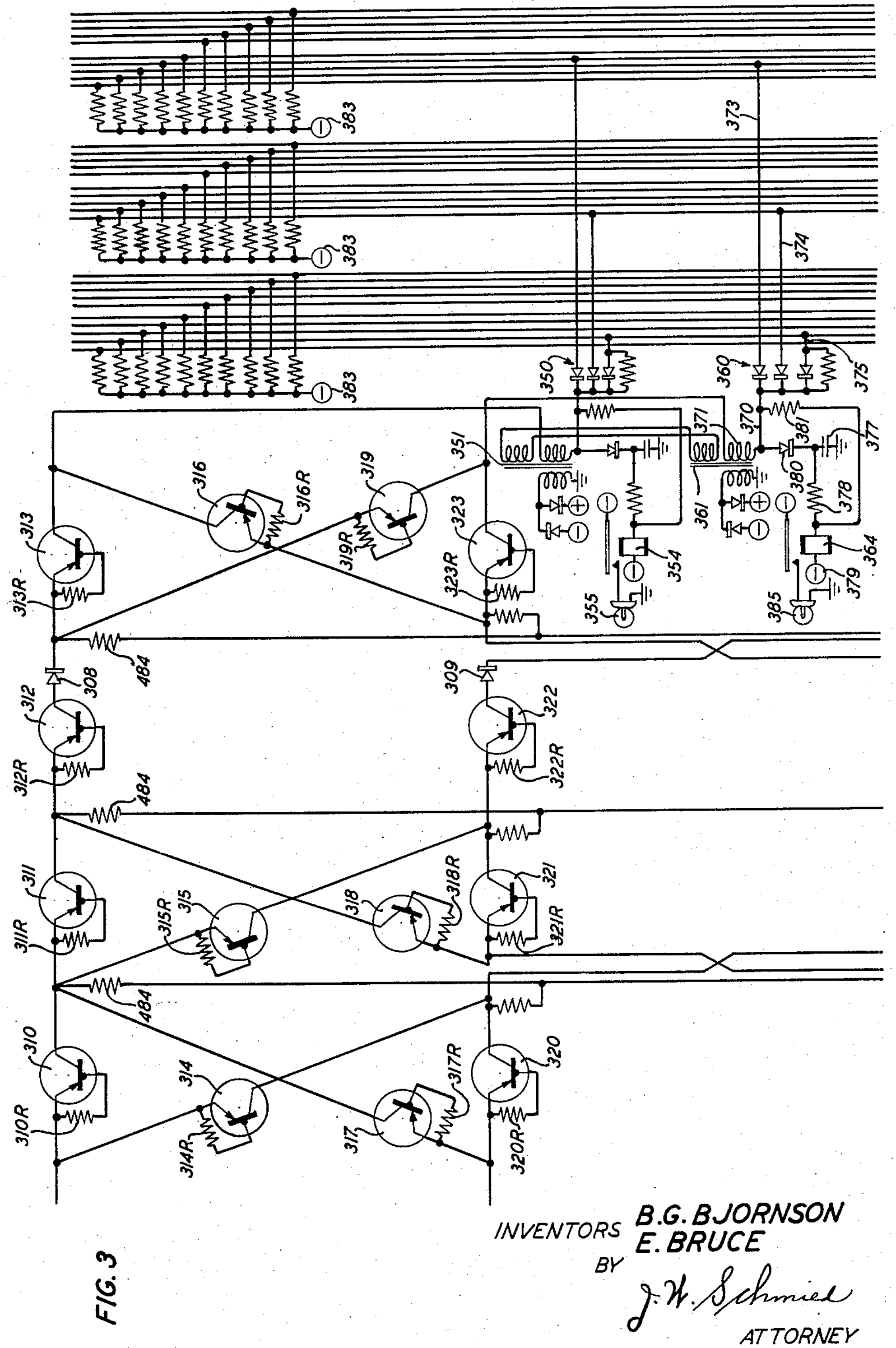
Figures 4, 5, 6:
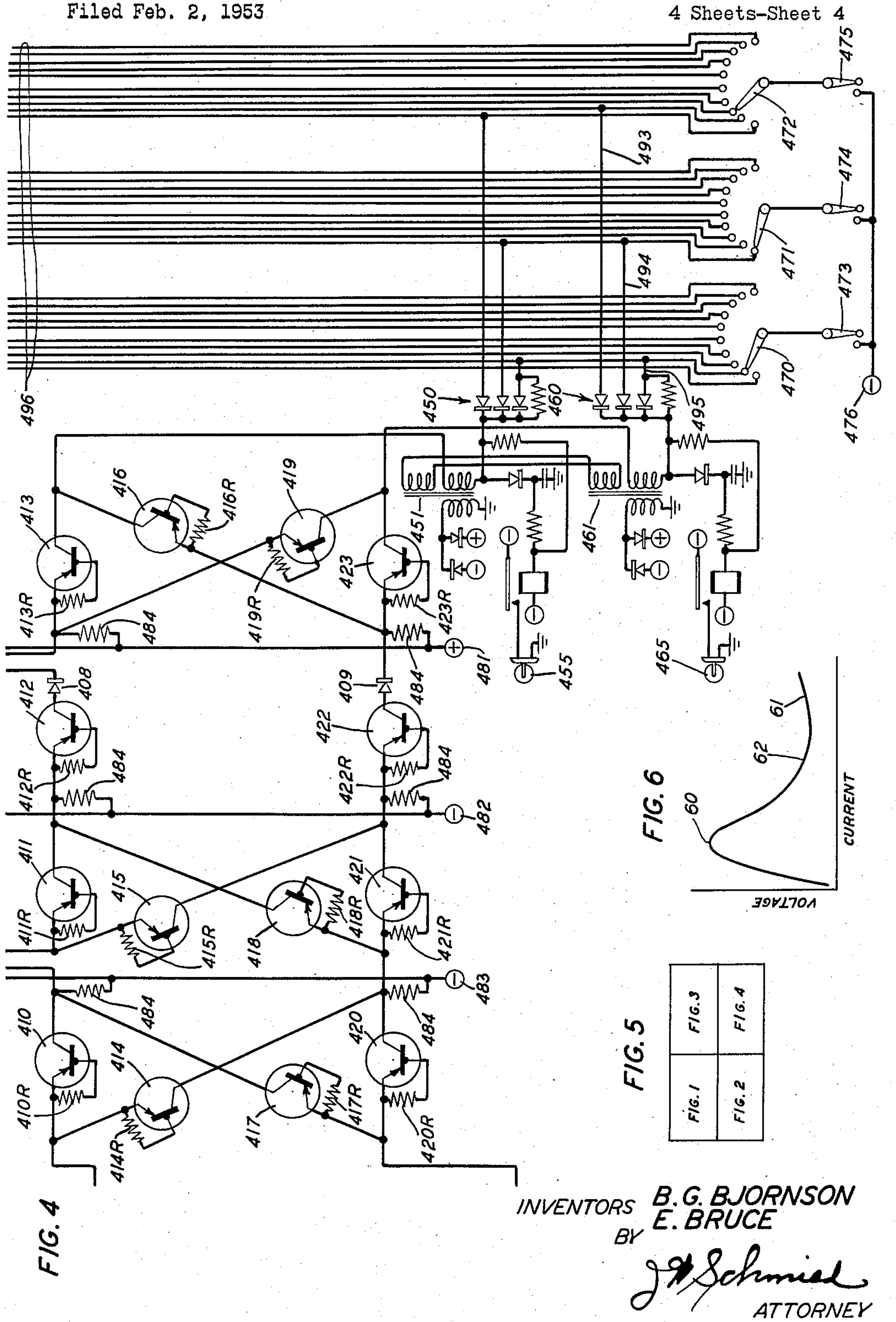

Figs. 1, 2, 3 and 4, when positioned adjacent one another in accordance with the arrangement shown in Fig. 5, disclose the circuit details of representative lines and two common transmission circuits of an automatic telephone switching arrangement embodying the present invention. These circuits are representative of many more similar types of circuits with a subscriber's line circuit and related equipment being provided for each of the subscribers or each party line and sufficient transmission circuits being provided to permit a maximum simultaneous busy hour number of calls to be established through the system. The two transmission circuits shown are for intraoffice calls, but similar circuits may be provided for interoffice calls when one end of such circuits terminates at one switching center, or central office, and the other end terminates at another office.

Each subscriber's line has connected to it a line relay, such as 116 for the subscriber's station 110, a transformer 111 for transmitting voice currents and an operator's or supervisor's key 121. Key 121 may be operated from its normal position in one direction so that the left-hand set of contacts is closed, in which position the operator's position circuit and telephone set 209 are operatively associated with the subscriber's line. When the key 121 is operated in the other direction, the right-hand set of contacts is closed which causes ringing current to be applied to the subscriber's line from the source 280. Each of the other subscribers' stations, such as 130, 210 and 230, is similarly provided with terminal equipment. In addition, each subscriber's line is provided with a group of supervisory lamps, such as 118, 119 and 120. Lamp 120 is a busy lamp and lights, as is hereinafter described, at all times during which the subscriber's line is busy and connected to another subscriber; lamp 119 is a calling lamp and lights, as is hereinafter described, each time a subscriber initiates a call; and lamp 118 is a disconnect lamp and lights, as is also hereinafter described, at the termination or abandonment of a call and indicates that the previously established connection from the subscriber's line should be interrupted and returned to normal.

Each subscriber's line has individual to it a group of semiconductor diodes, such as 003, for the subscriber's station or line 110, or 001 for the line 210. These diodes are a part of a line number group and are employed to selectively establish connections to the respective lines, as will be hereinafter described. A common transmission circuit is shown in Figs. 3 and 4 which utilizes the trunk number group with its groups of semiconductor diodes 350, 360, 450 and 460 for selectively establishing connections to this transmission circuit and to the transmission transformers 351, 361, 451 and 461 and busy lamps 355, 365, 455 and 465. The transmission circuit shown in Fig. 4 is similar to the transmission circuit shown in Fig. 3. Figs. 3 and 4, in addition, show a transistor switching and transmsission network having a plurality of two-terminal transistor devices 310 through 323 and 410 through 423. The transistors shown in this network are merely representative of a large number of similar transistors employed enabling connections to be established between any two subscribers' lines terminating at the switching center represented by Figs. 1 through 4. The transistors shown in Figs. 3 and 4 are arranged in four stages with the first stage on the left being commonly referred to as the primary line switch stage, the second stage or column from the left being referred to as the secondary line switch or line frame stage, the third column from the left being referred to as the secondary trunk switch or switch frame stage, and the last stage on the right being referred to as the trunk primary frame or switch stage. These stages and the operation of the transistors included therein will be hereinafter described in detail. In order for the operator to establish and interrupt transmission paths through the system, briefly described above, a series of switches or registers shown across the bottom of Figs. 2 and 3 are utilized. These switches and the operation thereof will also be hereinafter described.

In order to illustrate the operation of the circuit, as shown in Figs. 1 through 4, assume that the subscriber at station 110 wishes to communicate with or call a subscriber at station 210. When the subscriber at station 110 lifts the receiver or handset the contacts in the subscriber's set are actuated in a manner well known in the art to close a direct-current path between the two line conductors of the subscriber's line. The direct-current path is from the battery 131 through the right winding of line relay 116, over the subscriber's line and back to ground through the left winding of relay 116. Relay 116 in this manner operates and closes thereby a circuit for lighting the calling lamp 119 from ground through the operated contact of relay 116 and the normal contact of relay 117 to battery 132 through the calling lamp 119.

The operator at the switching station, upon observing the lighted lamp 119, operates the talking key 121 associated with this lamp to close its left-hand contacts and thereby connect the operator's telephone circuit 209 to the subscriber's line extending to station 110. The operator will then inquire as to the number desired by the subscriber, observing the calling and busy lamps of the called subscriber's line, and if the line is idle, will operate selector switches 270, 271, and the common pair 272 and 273 in accordance with the identity of the hundreds digit, tens digit and units digit, respectvely, of the desired subscriber's line. Assuming that the line to station 210 is idle, the respective calling and busy lamps 220 and 219 will be extinguished and the operator thereupon sets the switches 270 through 273 in accordance with the number 001 which is assumed to be a directory number assigned to station 210. The switch 273 is set in accordance with the units digit of the directory number, as is the switch 272, but functions however only during the disconnect sequence of operations, as is hereinafter described. The setting of switches 270 through 273 selects the called subscriber but the operator has to select an idle circuit from the calling to called subscriber through the switching networks shown in Figs. 3 and 4. The operator therefore observes the common communication circuit busy lamps 355, 365, 455, 465, etc. and selects an idle circuit such as the one, for example, associated with the busy lamp 365. The operator thereupon operates the keys 470, 471 and 472 in accordance with the number assigned to this transmission circuit which is assumed to be 102 in the specific arrangement disclosed in Figs. 3 and 4. The switches 470, 471 and 472 are shown in this position and the switches 270 through 273 are shown in a position, as described above, corresponding to the number 001.

With the switches 270 through 273 set in accordance with the number of the called subscriber's station and switches 470 through 472 set in accordance with the number of an idle trunk circuit, the operator operates a start or connect key which comprises the switch elements 274 through 277 and 473 through 475. These elements may be individually operated or they may be operated in groups or they may be all operated from one manually operated key or from one or more relays which in turn are simultaneously operated from a manually operated key.

The operation of the switch elements 274 through 277 to the left by the operator connects the plus 12-volt battery 278 to the semiconductor diode groups 001, 003, etc. causing one of the groups 001, 003, etc. to apply the breakdown initiating condition or an operating condition, as is hereinafter described, to a point in the switching network shown in Figs. 3 and 4. The operation of the switches 473 through 475 connects the minus 12-volt battery 476 and similarly causes one of the semiconductor diode groups 350, 360, 450, 460, etc. to apply a breakdown initiating condition to the switching network. In the specific exemplary embodiment of Figs. 1 through 4 the diode groups 001, 003, etc. which may be representative of one thousand diode groups and the diode groups 350, 360, 450, 460, etc. which also may be representative of one thousand groups are "and" circuits or gates. In the "and" or coincidental circuit or diode group circuit 001, for example, the diodes or varistors 240, 241 and 242 are poled in such a manner so that the output lead 243 can never assume positive potential appreciably above the least positive input lead 250, 251, or 252. These leads are connected respectively to the contacts of the switch elements 272, 271 and 270 through the bus bars 281. The bus bars 281 are normally maintained at the biasing potential of plus 5 volts by the batteries 165 through the resistors 166. Since the input leads 250 through 252 are at plus 5 volts when inactivated, and the resistance 260 is large in comparison with the forward resistance of the varistor or rectifier units 240 through 242, the potential of the output lead 243 remains close to plus 5 volts as long as any of the input leads 250 through 252 are inactivated. The input leads 250 through 252 are activated from the plus 12-volt battery 278, described above, and when all three are activated thereby the potential upon the output lead 243 rises to a point to approximately plus 9 volts. The exact positive potential which the output lead 243 may reach depends upon the voltage dividing action of resistance 260, and the parallel combination of the back impedances of rectifiers 240 through 242 and the resistance 244. Power to the output lead 243 is supplied from the batteries 278, 261 and 165. The battery 261 connected to resistor 260 has a potential source of plus 5 volts and supplies, as is hereinafter described, the sustaining potential for the switching network shown in Figs. 3 and 4.

The semiconductor diode 242 is shunted by a resistor 244 which has a resistance that is small compared to the average back resistance of the diodes 240 through 242 but large compared to the forward resistance of these diodes. By using a proper value for the resistor 244 it is possible to produce an output voltage amplitude upon lead 243 within close tolerance ranges while using semiconductor diodes which have back resistances that vary by a factor of ten to one. The discharge, marking, or breakdown potential of approximately plus 9 volts upon the lead 243 is applied through the winding 213 of the transmission coil 211 to the transmission circuit or network of Figs. 3 and 4. The inductance and resistance of winding 213 serve as lock-out elements, as is well known in the art, permitting only one path to be established through the transmission network of Figs. 3 and 4.

In the specific embodiment disclosed herein the diode groups 001 and 003 represent one thousand numbers since each diode group has a hundreds, tens and units diode. The present invention is not necessarily restricted to this specific embodiment as any number of diodes may be utilized in a number group and thus any number of calling lines may be controlled.

The diode group circuits 001, 003, etc., described above, used for marking the called line are essentially duplicated at the trunk selecting end by the diode groups 350, 360, 450, 460, etc. This trunk number group differs however in that negative instead of positive voltages are applied on the input information digit leads and a negative output marking voltage is applied to the trunk end of the switching network. For example, when the switches 470, 471 and 472 are set in accordance with the digits 102, the minus 9 volts due to the voltage divider action in the diode gate from the minus 12-volt battery 476 are connected through the diode group 360 and the transmission coil 361 to the transistor switching network. The battery 476 is connected through the switches 473, 474 and 475 and the selectors 470, 471 and 472 to the input leads 373, 374 and 375 of the trunk diode group 360. The selector 470 connects the minus 12 volts to the one hundred diodes such as 375, 495, etc. of the diode groups 360, 460, etc. that represent numbers having a "1" in the hundreds place. The selector 471 connects the minus 12 volts from battery 476 to one hundred diodes of numbers corresponding to a "0" in the tens place, but only ten of these are also in the same group as the one hundred diodes of numbers corresponding to "1" for the hundreds place. The selector 472 selects one hundred numbers corresponding to "2" in the units place and thus narrowing the selection to the one group corresponding to the number 102 which is the diode group 360. The minus 12 volts applied to the three input leads 373, 374 and 375 cause the potential upon output lead 370 to decrease from minus 5 volts to approximately minus 9 volts.

In this manner the diode group circuits 001 and 360 select the two terminal points of the transistor switching network between which it is desired to establish a connection. The marking potentials applied to the leads 243 and 370 are relatively high voltages and successively initiate the selection of a single path from one of the leads to the other.

The transistors 310 through 323 and 410 through 423 used in the switching network have a characteristic illustrated in Fig. 6 which shows the relationship between the voltage across a cross-point or transistor and the current through it. As the current through the cross-point rises the voltage across the cross-point also rises until the breakdown potential of 10 volts at point 60 is reached. When the breakdown potential of 10 volts is reached the voltage across the cross-point rapidly decreases as the current continues to increase. This region of decreasing voltage with increasing current is frequently referred to as a negative resistance region and commonly occurs in transistors between currents of approximately 0.3 milliampere and 1 milliampere. After the latter current value is reached, the voltage across the cross-point levels off and increases slightly. The base resistance provides for the relatively high ratio between the breakdown potential at point 60 and the sustaining potential at point 61. With a base resistance value of approximately 800 ohms, the ratio between the breakdown and sustaining potentials is approximately six to one. The small resistance or relatively negligible resistance between the emitter and collector causes the relatively flat sustaining portion of the curve shown in Fig. 6 in the vicinity of point 61. Placing a larger resistance in the emitter lead would cause a larger slope in this positive resistance region. Some examples of transistors which may be used in the transistor switching network, described above, are disclosed in the patent to J. Bardeen and W. H. Brattain identified above. In order to secure satisfactory working ranges and limits it is necessary that the breakdown and sustaining potentials be relatively far apart. It is desirable, in order words, that the voltage required to break down the transistor cross-point or cause it to enter its negative resistance region should be appreciably greater than the voltage across the cross-point required to maintain a substantial current therethrough. Moreover, it is highly desirable that the operating characteristics of each of the several transistors be as nearly similar to the operating characteristics of the other transistors. It is also desirable that battery variations and variations in the values of the other circuit elements and parameters be as small as practicable in order to secure the greatest operating margin.

After the setting of the switches 270 through 273 and 470 through 472 and the application of the marking potentials from batteries 278 and 476, as described above, approximately plus 9 volts appear at the emitters of the transistor cross-points 410 and 414 and approximately minus 9 volts appear at the collectors of the transistor cross-points 319 and 323. The junction between the primary and secondary trunk stages, as is hereinafter described, is maintained at a positive potential by the plus 3-volt battery 481; the junction between the secondary line and trunk stages is maintained at a negative potential by the minus 5-volt battery source 482 and the junction between the primary and secondary line stages is kept at a negative potential by the minus 3-volt potential source 483. The batteries 481, 482 and 483 are connected to these junctions through a plurality of resistors 484 so that when no current flows through any of the cross-points 310 through 323 or 410 through 423, etc. the junction points between the cross-points are at potentials in accordance with the batteries 481 through 483. The junction, for example, between the transistor cross-points 410 and 321 is at a potential of minus 3 volts.

The transistors require a potential between the emitter and collector of plus 12 volts to enter the negative resistance region as described above and as shown in Fig. 6. With plus 9 volts applied from the diode group 001 to the emitter of the transistor cross-point 410 and minus 3 volts applied to the collector from the battery 483, the transistor cross-point 410 breaks down. When the transistor cross-point 410 conducts the voltages thereacross reduce to a potential of approximately 2 volts so so that the potential on the collector of transistor 410 increases to approximately plus 7 volts. The voltage across the resistor 484 connecting this junction to the battery 483 rises to approximately 10 volts. The resistances 484 in series with the paths to the potential sources 481 through 483 are sufficiently high so that the current through any cross-point is restricted to the negative resistance region described above as at point 62 in Fig. 6. There is a resistor 484 individual to each of the transistors 310 through 323 and 410 through 423. This restriction by the resistors 484 prevents lock-out from occurring and permits breakdown, as is hereinafter described, of all cross-points extending to idle junctions. The limiting resistors 484 are individual to each cross-point so that all possible idle cross-points or paths are marked. The lock-out phenomenon can only take place in circuits having little or no resistance or impedance individual to the respective transistors and lock-out occurs only when impedance of the circuit external to the transistors is substantially common to the transistors among which the lock-out is desired. If either of the transistors 410 or 414 in the primary line stage is connected to a cross-point in the secondary line stage that is busy or being utilized for another call, the collector potential will be insufficient, as is hereinafter described, to cause breakdown therethrough. In the illustrative example described herein the transistor 414 breaks down in a similar manner as the transistor 410, and its collector rises from a potential of minus 3 volts to a potential of plus 7 volts. The collector of the transistor 410 is connected to the emitters of transistors 318 and 321 and the collector of transistor 414 is connected to the emitters of transistors 418 and 421.

When the potential on the emitters of the transistor cross-points 321, 318, 421 and 418 increases from minus 3 volts to plus 7 volts, these transistors in turn break down as their collectors, as described above, are at a potential of minus 5 volts from battery 482 and thus 12 volts appear thereacross. At the same time that the cross-points 410 and 414 break down, a similar action takes place in the trunk stage where the cross-points 319 and 323 break down. The minus 9 volts on lead 370 are connected to the collectors of the cross-points 319 and 323 through the winding 371. The emitters of the transistor cross-points 319 and 323 are at a potential of plus 3 volts due to the battery 481 described above. The 12 volts from emitter to collector cause the transistor cross-points 319 and 323 to break down in a manner described above in reference to the transistors 410 and 414.

Although any stage or group of transistors may have been made to operate as the final selecting stage, under the assumed voltage conditions, described above, the third column or the secondary trunk stage is employed as the final selecting stage. This stage is employed to select one of the many possible paths between the two terminal points from the diode groups 001 and 360. When the first, second and fourth stages from the left have functioned to break down the selected transistors located therein, the voltage applied to the emitter side of the third column is plus 5 volts and the voltage applied to the collector side is minus 7 volts. This voltage difference of 12 volts is sufficient to initiate the breakdown through idle transistors of the third column which are connectable through transistors of the other columns to the diode groups 001 and 360. One path from the line terminal group 001 is through the transistors 410, 318, 312 and 319 to the trunk diode group 360 and another path is through the transistors 414, 418, 412 and 323 and breakdown initiating potentials are therefore applied to the two transistors 312 and 412. The two paths however, described above, extend to the diode groups 001 and 360 through the inductance of the lower right-hand windings 213 and 371 of the coils 211 and 361. This inductance and the related circuit resistance are substantially all of the impedance in series with the transistor paths, described above, and therefore operate as a lock-out impedance element. When breakdown or conduction commences through one of the transistors 312 or 412, the voltage drop across the inductance of the windings 213 and 371 causes the voltage to rapidly reduce so that breakdown is not commenced through any of the other transistors in the third column, since the total circuit impedance reduces, the current through the selected path, for example comprising the transistors 414, 418, 412 and 323, rises to a much higher value than that corresponding to point 61 on the positive resistance portion of the curve of Fig. 6. The voltage drop across each of the selected transistors is at this time approximately 2 volts so that the switching network requires a sustaining potential of 8 volts thereacross. Since the switching network is symmetrical the junction point between the transistors 418 and 412 will be substantially at ground potential.

With a potential of 2 volts across each of the transistors 414, 418, 412 and 323, these transistors will test busy to other transistors which may attempt to establish a path through the system. Since an insufficient voltage will be supplied to these other transistors, as is hereinafter described, the established path is therefore not disturbed or interfered with by later attempts to establish other paths through the switching network. For example, with 2 volts across the transistors in the selected path, the junction in this path between the first and second stages from the right will be at a potential of plus 2 volts. If the terminal to transistors 417 and 420 is subsequently marked, the transistor 420 cannot break down as the existing potential thereacross will only be 7 volts instead of the required 12. The transistor 417, however, will break down if its collector is at a potential of minus 3 volts due to the battery 483. The same or similar conditions exist between all of the other possible alternative paths to the path comprising transistors 414, 418, 412 and 323. If the path and the individual sections of transistors or cross-points thereof thus in effect test busy for such potentials applied to them then other transistors connected to this path will not break down.

The sequence of operations, as described above, occurs when the operator actuates the switch elements 274 through 277 and 473 through 475 to the left-hand or connect position. When the operator returns or restores the switch elements to their middle or neutral position, the voltages applied from batteries 278 and 476 are removed and the bus bars 281 and 496 restore from plus and minus 12 volts to plus and minus 5 volts, respectively. The 5-volt potentials are due to the normal biasing batteries 165 and 383, described above. Upon the restoration of the switch elements 274 through 277 to their normal or neutral position, the relays 217 and 364 operate. When the plus 9 volts from battery 278 are removed from the bus bars 281 the potential upon output lead 243 from the line diode group 001 falls from plus 9 volts and allows the diode 264 to unblock a path from the sustaining potential source 261, resistor 262 and relay 217 to the switching network. The diode 264 is connected in series with the winding of relay 217 and is poled so as to oppose the flow of current from the output lead 243 when the output lead is higher than plus 5 volts. When the voltage is at its plus 9-volt value the diode 264 reduces the current through output lead 243 and relay 217 to battery 261. Substantially all of the current through the output lead 243 is therefore available to control the establishment of a path through the switching network. When the plus 9 volts are removed from the output lead 243 the diode 264 does not materially affect or interfere with the flow of current through relay 217 and the transistor cross-points. The operation of relay 217 closes an operating path through the busy lamp 220 and the disconnect lamp 218. Similarly on the trunk side the relay 364 operates from the minus 5-volt battery 379 through resistor 378 and diode 380 from the switching network. The operation of relay 364 operates the busy lamp 365 to indicate to the operator that the transmission circuit associated with the trunk diode group 360 which is designated by the number 102, as described above, is busy.

When the switches 274 through 277 and 473 through 475 are restored to their neutral position and the bus bars 281 and 496 change their potentials from plus and minus 12 volts to plus and minus 5 volts, respectively, the transistors that were selected but are not part of the selected path restore to normal. For example, the transistor 319 triggered when minus 9 volts was applied to its collector and plus 3 volts was applied to its emitter. The potential upon the emitter changed from plus 3 volts to minus 7 volts after breakdown with 10 volts appearing across its corresponding resistor 484 connected to the battery 481. As long as the minus 9 volts is impressed upon its collector, the transistor 319 remains conducting or broken down. When the potential upon the bus bars 496 and correspondingly upon the collector of transistor 319 increases from minus 9 volts to approximately minus 5 volts the transistor 319 restores to normal. The other partial paths or transistors similarly restore to their idle or normal condition wherein they may be employed to establish other connections. The interruption of the paths to the batteries 278 and 476 merely causes the current flowing through the transistors 414, 418, 412 and 323 to reduce to that corresponding to point 61 in Fig. 6. The values of the resistors 262, 260, 378, 381 and the resistance of the relays 217 and 364 are chosen so that the total current flowing through the selected transistors is approximately 8 milliamperes. Thereafter current conditions through the selected path remain substantially the same during the time the connection is established.

The operator thereafter operates the switches 270 through 273 in accordance with the number assigned to the calling station 110 which, in the specific embodiment disclosed herein, is 003. The operator also operates the selector switches 470 through 472 in accordance with the number assigned to the other end of the transmission circuit which, in the exemplary embodiment set forth herein, is 103. The numbers 103 and 102 represent the two connections to the selected trunk. The operator then again operates the switch elements 274 through 277 and 473 through 475 to the left-hand position causing the diode groups 003 and 350 to mark the two ends of the path through the switching network. In a similar manner, as described above, in reference to the marking of the transistor switching network by the diode groups 001 and 360, a path is selected through the switching network. For the purpose of illustration it is assumed that this path comprises the transistors 310, 311, 312 and 313. Upon the selection of this path potentials between the various transistors assume the values described above in reference to the first-described selected path so that this path in turn tests busy at each of the junctions between the various transistors. Other transistors connected to these selected transistors thereafter test busy upon the attempted breakdown thereof. When the operator restores the start key to its neutral position once again removing the batteries 278 and 476, the path comprising the transistors 310 through 313 remains functioning passing a current of approximately 8 milliamperes. The relays 117 and 354 similarly operate causing the busy lamps 120 and 355 to light and the calling lamp 219 to extinguish. The operator notes the lighting of these lamps and actuates the ringing key 221 to its ringing position or to the right to apply ringing current from the source 280 to the called subscriber's line 210.

When the called subscriber at the substation 210 answers, an operating path is closed through relay 216 causing it to operate. When relay 216 operates, it interrupts the circuit of the answering disconnect lamp 218 thus indicating to the operator that the called party has answered. The operator will thereupon cease to operate the ringing key 221 and will attempt to establish other paths through the switching equipment in response to other calls. The two subscribers are now in direct communication with each other and the battery 131 through the winding of relay 116 supplies talking battery to the subscriber's station 110 and relay 216 supplies therethrough talking battery 231 to the subscriber's station 210. The voice currents transmitted from station 110 travel through the subscriber's line and through the transmission coil 111, the primary coils of which are connected to each other by the capacitor 135, then through the lower right-hand winding 113, transistors 310 through 313, coils 351 and 361, transistors 323, 412, 418 and 414 through the winding 213 over the subscriber's line to station 210. The voice frequency currents from station 210 are transmitted over the same path in the reverse direction to the subscriber's station 110 and thus provide in this manner a complete two-way communication path between the two subscribers' stations. The transmission path from the winding 213 is through the diode 264 and thereafter through the capacitor 222 to ground. The impedance of this path is sufficiently low so that only a small transmission loss is introduced into the circuit due to these elements. It should also be noted that the transformers 111 and 211, as well as the transformers 351 and 361, have an additional winding wound thereon connected to a pair of diodes or varistors. This additional winding, for example, the winding 112 of transformer 111, is connected through the diodes 115 and 114 to the positive and negative potential sources 134 and 133, respectively. The diodes 115 and 114 are oppositely poled to the biasing voltages of batteries 134 and 133 to operate as a limiter for suppressing transient surges in the switching network which exceeds the bias limits provided for each of the rectifiers 115 and 114. The rectifiers 115 and 114 and related winding 112 thus reduce the effect of switching circuits upon the established voice frequency path and, in addition, limit to unobjectionable value any transients coming from the subscriber's station or at least over the subscriber's line which is of sufficient magnitude to possibly interfere with the operation of the switching network. Each of the transformers 111, 121, 351, 361, etc., are described above, has this limiting circuit associated therewith. In addition, the diodes or varistors 308, 309, 408 and 409 are connected serially in the third stage to the collectors of the transistors located therein. These diodes are necessary since the transistor switching network has high impedance in only one direction and not in both directions as a gas tube network. In the absence of the diodes 308, 309, 408 and 409 the batteries 482 and 481 would send current through the matching stage. If the emitters of the transistors 312, 322, 412 and 422 in the matching stage are good rectifiers, that is, have high back impedances, the diodes can be connected in the base circuits in series with the base resistances 312R, 322R, 412R and 422R. At the completion of the call each of the subscribers hangs up and interrupts the current flowing through the respective relays 116 and 216 causing these relays to release. Relay 116, upon releasing, completes a circuit for lighting the disconnect lamp 118 and the relay 216, upon releasing, completes a circuit for lighting the disconnect lamp 218. The busy lamps 120 and 220, however, continue to be energized or lighted at this time. The operator upon noting the lighted disconnect lamps 118 and 218 sets the selector switches 270 through 273 once again in accordance with one of these lines, as for example, 001 for line 210. The operator thereafter operates the start key consisting of the switches 274 through 277 to its disconnect or right-hand position. When the switches 274 through 277 are actuated to the right the plus 12 volts from battery 278 are connected therethrough to the bus bars 281. The switch 277 is now effective and the switch 276 is not. The plus 12 volts are connected through the bus bars 281 to the release gates associated with the various line circuits and as shown in accordance with the setting of switches 270 through 273 specifically to the release gate consisting of diodes 246, 247 and 248. When the plus 12 volts are applied to the three input leads to the release gate, a square wave shaped pulse is present at the common point of the three diodes 246 through 248. On the portion of the square pulse when the pulse is going positive the gate looks into a differentiating circuit having a large time constant. The large time constant is caused by semiconductor diode 264 which is biased in its back direction. The effect of the large time constant will round off the pulse caused by this positive step. The amplitude of the positive pulse is also limited due to the clamping action of the diode 242 through the capacitor 245. The potential upon output lead 243 is thus substantially restricted to the normal plus 5-volt level. For the negative step at the end of the pulse the time constant is low since the diode 264 is now biased in its forward conducting direction. This step is therefore differentiated into a sharp negative pulse of approximately 3 volts which is capable of releasing the path through the switching network terminated at this line circuit, as is hereinafter described. The release gate and differentiating circuit may be designated as a polarization sensitive differentiating circuit.

The negative pulse from the release gate and differentiating circuit, as described above, is connected in the specific embodiment disclosed herein to the emitter of the transistor 414 causing it to return to normal. The potential upon the collector of transistor 414 thereupon decreases to its normal minus 3 volts due to battery 483 causing the transistor 418 in turn to stop conducting. When the transistor 418 returns to normal its collector potential reduces to minus 5 volts causing the transistor 412 to return to normal. The transistor 412 in a similar manner causes the transistor 323 to release. The operator, after releasing the start key, resets the selector switches 270 through 273 in accordance with the line 110. The operation thereafter of the start key reduces the voltages applied to the selected path consisting of transistors 310, 311, 312 and 313, described above, causing it to release and restore to its idle condition.

Various modifications are possible without departing from the spirit of the invention, as for example, it is not necessary to have the release gates at the line end since they could be located as well as the trunk end and the release of the switching network would commence therefrom. While the manner of operating the system has been described with reference to four subscribers' lines and two intraoffice trunks, the same principles and mode of operation apply to large comprehensive telephone switching arrangements.

It is also not necessary to utilize the specific two-terminal transistor cross-point disclosed herein as long as the transistor circuit has a collector-to-emitter current ratio greater than one and preferably a high back impedance. For example, the transistor circuits disclosed in the application Serial No. 300,235 to J. J. Ebers, filed on July 22, 1952; the application Serial No. 300,220 to W. Shockley, filed on July 22, 1952; and the application Serial No. 157,504 to Bray-Davis filed on April 22, 1950, can be utilized. Utilizing transistor cross-points having a high back impedance would obviate the necessity for the diodes 308, 309, 408 and 409.

It is to be understood therefore that the above-described arrangements are illustrative of the application of the principles of this invention and that still further arrangement may be devised by those skilled in the art without departing from the spirit and scope of the invention.

What is claimed is:

1. A switching network comprising a plurality of inlets and outlets and paths therebetween; said paths therebetween comprising a plurality of transistor cross-points; means including said cross-points for selecting one of said plurality of paths between one of said plurality of inlets and one of said plurality of outlets, each of said transistor cross-points being a bistable circuit arrangement and including a transistor device which is included in at least one of said paths.

2. A transistor switching system comprising a plurality of transistor cross-points; a plurality of inlets and outlets; connecting means from each of said cross-points to others of said cross-points, from some of said cross-points to said plurality of inlets and from others of said cross-points to said plurality of outlets; and means for marking one of said inlets and one of said outlets to cause the operation of said cross-points to select a single path from said marked inlet to said marked outlet, each of said transistor cross-points having a three-terminal transistor connected as a two-terminal element between said connecting means.

3. A transistor switching system comprising a plurality of transistor cross-points; a plurality of inlets and outlets; connecting means from each of said cross-points to others of said cross-points, from connecting means some of said cross-points to said plurality of inlets and from others of said cross-points to said plurality of outlets; means for marking one of said inlets and one of said outlets to cause the operation of said cross-points to select a single path from said marked inlet to said marked outlet; each of said transistor cross-points comprising a positive feedback resistor and a transistor having at least an emitter, collector and base electrode, said positive feedback resistor connecting said base with said emitter electrode, said emitter electrode forming a first terminal of said cross-point and said collector electrode forming a second terminal of said cross-point, said first and said second terminals of said cross-points being selectively and directly connected to said first and said second-mentioned connecting means.

4. In a switching system in combination, a plurality of lines; a switching network interconnecting said lines comprising a plurality of transistor cross-points and a selectable terminal for each of said lines; means for applying marking potentials to selectable of said selectable terminals in said network; means including said cross-points responsive to said potentials for selecting and maintaining a path between said selected terminals through some of said transistor cross-points in series; means for superimposing varying voltages representing communication signals between said selected terminals; and means for applying interrupting potentials to said selected terminals; each of said transistor cross-points comprising a positive feedback resistor and a transistor having an emitter, collector and base electrode, said positive feedback resistor connecting said base with said emitter electrode, said emitter electrode forming one terminal of said cross-point and said collector forming a second terminal of said cross-point, said varying voltages passing through said one and said second terminals of each of said cross-points in said selected and maintained path.

5. In a switching system, incoming circuits and outgoing circuits; a plurality of paths each comprising a plurality of sections for connecting an incoming circuit to an outgoing circuit; a transistor for each section; means for indicating to adjacent sections the busy or idle condition of a respective section; means for marking an incoming circuit and an outgoing circuit; means including said transistors for selecting one of said plurality of paths between said marked incoming and said marked outgoing circuits, and means for applying varying potentials representing communication signals between said marked incoming and said marked outgoing circuits and through said transistors in said selected path.

6. In a communication system, a first group of terminals; a second group of terminals; multistage switching equipment between said two groups of terminals for selectively connecting any one of said first group of terminals with any one of said second group of terminals comprising a plurality of transistors; means for applying a marking condition to one of the terminals of said first and second group of terminals; means including said transistors for extending an electrically conductive circuit for said marking condition from said marked terminals through all idle paths of said multistage switching equipment between said marked terminals; means including said transistors for selecting one of said idle paths between said marked terminals, and means for superimposing varying potentials representing communication signals across said selected path and through said transistors in said selected path.

7. In a communication system, a first group of terminals; a second group of terminals; multistage switching equipment between said two groups of terminals for selectively connecting any one of said first group of terminals with any one of said second group of terminals comprising a plurality of transistors; means for applying a marking condition to one of the terminals of said first and second group of terminals; means including said transistors for extending an electrically conductive circuit for said marking condition from said marked terminals through said transistors all idle paths of said multistage switching equipment between said marked terminals; means including said transistors for selecting one of said idle paths between said marked terminals; and rectifier means connected in series with each of said transistors in one of said stages to effect a high impedance through said switching equipment in both directions.

8. In a switching system in combination, a plurality of lines; a plurality of trunks; a multistage switching network interconnecting said lines comprising a plurality of transistor cross-points and a selectable terminal for each of said lines and trunks, each of said transistor cross-points being a two-terminal device having a collector-to-emitter current ratio greater than unity, a relatively high impedance in either direction before breakdown and a relatively low impedance after breakdown; means for applying marking potentials to selected of said selectable terminals upon the initiation of a call; means including said transistor cross-points responsive to said marking potentials for selecting and maintaining a path between said selected terminals through one transistor for each stage, and means for supplying varying voltages representing communication signals through said selected path.

9. In a switching system in combination, a plurality of lines; a plurality of trunks; a multistage switching network interconnecting said lines comprising a plurality of transistor cross-points and a selectable terminal for each of said lines and trunks, each of said transistor cross-points being a two-terminal device having a collector-to-emitter current ratio greater than unity, a relatively high impedance in one direction before breakdown and a relatively low impedance after breakdown; means for applying marking potentials to selected of said selectable terminals upon the initation of a call; means including said transistor cross-points responsive to said marking potentials for selecting and maintaining a path between said selected terminals through one transistor for each stage, one of the stages in said network being the matching stage where the selection of said selected path occurs, and the junctions between said stages being connected to a potential source; and a rectifier means connected in series with each of said transistors in one of said stages to effect a high impedance through said switching equipment in both directions.

10. A transistor switching network comprising a plurality of transistor cross-points, each of said transistor cross-points being a two-terminal device having a collector-to-emitter current ratio greater than unity, a relatively high impedance in one direction before breakdown and a relatively low impedance after breakdown and comprising a transistor having a base emitter, collector electrode and a positive feedback resistor; said resistor connecting said base and emitter electrodes to provide for a large ratio between breakdown and sustaining potentials; means for connecting said cross-points serially to form talking channels; and rectifier means connected in series with said talking channels for making said transistor switching network a high impedance circuit in both directions before breakdown.

11. In a switching system in combination, a plurality of lines; a plurality of trunks; a multistage switching network interconnecting said lines comprising a plurality of transistor cross-points and a selectable terminal for each of said lines and trunks, each of said transistor cross-points being a two-terminal device having a collector-to-emitter current ratio greater than unity, a relatively high impedance in either direction before breakdown and a relatively low impedance after breakdown; means for applying marking potentials to selected of said selectable terminals upon the initiation of a call; means including said transistor cross-points responsive to said marking potentials for selecting and maintaining a path between said selected terminals through one transistor for each stage, one of the stages in said network being the matching stage where the selection of said selected path occurs; and potential means connected to the junctions between said stages.

12. In a switching system a plurality of lines; a plurality of trunk circuits; a switching network for selectively interconnecting any of said lines with any of said trunks; said network comprising a plurality of transistors arranged in successive stages between said lines and trunks; control potential sources connected to the junctions of said successive stages; means for applying breakdown initiating potentials to a selected one of said lines and to a selected one of said trunks causing together with said control potential sources the transistor in said stages adjacent said selected line and trunk to break down; means including said control potential sources responsive to the breakdown in said stages adjacent said lines and trunks for initiating the breakdown of transistors in other stages; and selecting means including one of said stages for selecting a path through some of said conducting transistors from said line to said trunk.

13. A switching network comprising in combination, a plurality of two-terminal devices, each of said two-terminal devices having a pair of terminals, transistor means including an emitter portion interconnected with one of said terminals, a collector portion interconnected with the other of said terminals, and a body portion of semiconducting material, a feedback path including a resistor connected between said body portion of said transistor means and one of said terminals whereby said device is characterized by a stable state having a high positive resistance between said terminals in response to currents of low magnitude supplied to said terminals, an unstable state wherein said device has a negative resistance between said terminals when currents of intermediate magnitude are supplied to said terminals and a second stable state having low impedance between said terminals when currents of greater magnitude are supplied to said terminals; a source of electrical energy; means for simultaneously supplying said electrical energy to the terminals of a plurality of said devices; and a lockout common impedance element connected in series with said source of electrical energy for permitting only one of said devices to change from said first stable state to said second stable state.

14. A switching network comprising in combination, a plurality of two-state devices, each of said two-state devices having a pair of terminals, transistor means including an emitter portion interconnected with one of said terminals, a collector portion interconnected with the other of said terminals, and a body portion of semiconducting material, a feedback path including a resistor connected between said body portion of said transistor means and one of said terminals whereby said device is characterized by a stable state having a high positive resistance between said terminals in response to currents of low magnitude supplied to said terminals, an unstable state wherein said device has a negative resistance between said terminals when currents of intermediate magnitude are supplied to said terminals and a second stable state having low impedance between said terminals when currents of greater magnitude are supplied to said terminals; means for interconnecting said devices in a series circuit; a source of electrical energy; means for interconnecting said energy with said series circuit for causing one of said devices to change from its first stable low current state to its high current stable state whereby said other devices similarly change from low current stable state to their high current stable state in response to changing said one device from its low current stable state to its high current stable state.

15. A switching network comprising in combination, a plurality of two-terminal devices, each of said two-terminal devices having a pair of terminals, transistor means including an emitter portion interconnected with one of said terminals, a collector portion interconnected with the other of said terminals, and a body portion of semiconducting material, a feedback path including a resistor connected between said body portion of said transistor means and one of said terminals whereby said device is characterized by a stable state having a high positive resistance between said terminals in response to currents of low magnitude supplied to said terminals, an unstable state wherein said device has a negative resistance between said terminals when currents of intermediate magnitude are supplied to said terminals and a second stable state having low impedance between said terminals when currents of greater magnitude are supplied to said terminals; means for interconnecting said devices in a plurality of series circuits; a source of energy; a lockout impedance; and means for simultaneously applying said source of energy through said lockout impedance to a plurality of said series circuits whereby the changing of one of said devices in one of said series circuits from its stable low current condition to its stable high current condition prevents the devices in all of said other series circuits from changing from their low current stable condition to their high current stable condition.

16. A switching network comprising in combination, a plurality of two-terminal devices, each of said two-terminal devices having a pair of terminals, transistor means including an emitter portion interconnected with one of said terminals, a collector portion interconnected with the other of said terminals, and a body portion of semiconducting material, a feedback path including a resistor connected between said body portion of said transistor means and one of said terminals whereby said device is characterized by a stable state having a high positive resistance between said terminals in response to currents of low magnitude supplied to said terminals, an unstable state wherein said device has a negative resistance between said terminals when currents of intermediate magnitude are supplied to said terminals and a second stable state having low impedance between said terminals when currents of greater magnitude are supplied to said terminals; means for interconnecting said devices in a plurality of series circuits; a source of energy; a lockout impedance; means for simultaneously applying said source of energy through said lockout impedance to a plurality of said series circuits whereby the changing of one of said devices in one of said circuits from its stable low current condition to its stable high current condition prevents the devices in all of said other series circuits from changing from their low current stable condition to their high current stable condition, and also causes the other devices in said one series circuit to change from their low current stable condition to their high current stable condition.

17. A switching network comprising a plurality of input terminals and a plurality of output terminals, a plurality of two-terminal devices connected in a plurality of series circuits, each of said two-terminal devices having a pair of terminals, transistor means including an emitter portion interconnected with one of said terminals, a collector portion interconnected with the other of said terminals, and a body portion of semiconducting material, a feedback path including a resistor connected between said body portion of said transistor means and one of said terminals whereby said device is characterized by a stable state having a high positive resistance between said terminals in response to currents of low magnitude supplied to said terminals, an unstable state wherein said device has a negative resistance between said terminals when currents of intermediate magnitude are supplied to said terminals and a second stable state having low impedance between said terminals when currents of greater magnitude are supplied to said terminals; and means for interconnecting each of a plurality of said input terminals through one of said series circuits to one of said output terminals.

18. A switching network comprising in combination, a plurality of input terminals and a plurality of output terminals, a plurality of two-terminal transistor devices, each of said two-terminal transistor devices having a pair of terminals, transistor means including an emitter portion interconnected with one of said terminals, a collector portion interconnected with the other of said terminals, and a body portion of semiconducting material, a feedback path including a resistor connected between said body portion of said transistor means and one of said terminals whereby said device is characterized by a stable state having a high positive resistance between said terminals in response to currents of low magnitude supplied to said terminals, an unstable state wherein said device has a negative resistance between said terminals when currents of intermediate magnitude are supplied to said terminals and a second stable state having low impedance between said terminals when currents of greater magnitude are supplied to said terminals; a plurality of series circuits each including a plurality of said two-terminal devices; and a circuit path extending from each of a plurality of said input terminals to each one of a plurality of said output terminals and including one of said series circuits.

19. A switching network comprising a plurality of cross-points defining communication paths through said network, each of said cross-points being a bistable transistor circuit arrangement and including a transistor having a normally nonconductive condition and a conductive condition, means for supplying marking potentials to said transistors in said cross-points defining any one of said paths through said network causing said transistors in said one path to assume said conductive condition, and means for supplying varying potentials representing communication signals through said conductive condition transistors in said one path without causing any of said conductive condition transistors to assume said nonconductive condition.

References Cited in the file of this patent

UNITED STATES PATENTS

| | | |
|---|---|---|
| 2,291,752 | Parker | Aug. 4, 1942 |
| 2,590,950 | Eckert et al. | Apr. 1, 1952 |
| 2,620,448 | Wallace | Dec. 2, 1952 |
| 2,622,212 | Anderson et al. | Dec. 16, 1952 |
| 2,627,039 | MacWilliams | Jan. 27, 1953 |
| 2,629,021 | Robertson et al. | Feb. 17, 1953 |
| 2,706,811 | Steele | Apr. 19, 1955 |
| 2,722,567 | Davison et al. | Nov. 1, 1955 |
| 2,780,674 | Six et al. | Feb. 5, 1957 |

OTHER REFERENCES

Felker, J. H.: Typical Block Diagrams for a Transistor Digital Computer, Electrical Engineering, December 1952, pp. 1103–1108.